UNITED STATES PATENT OFFICE.

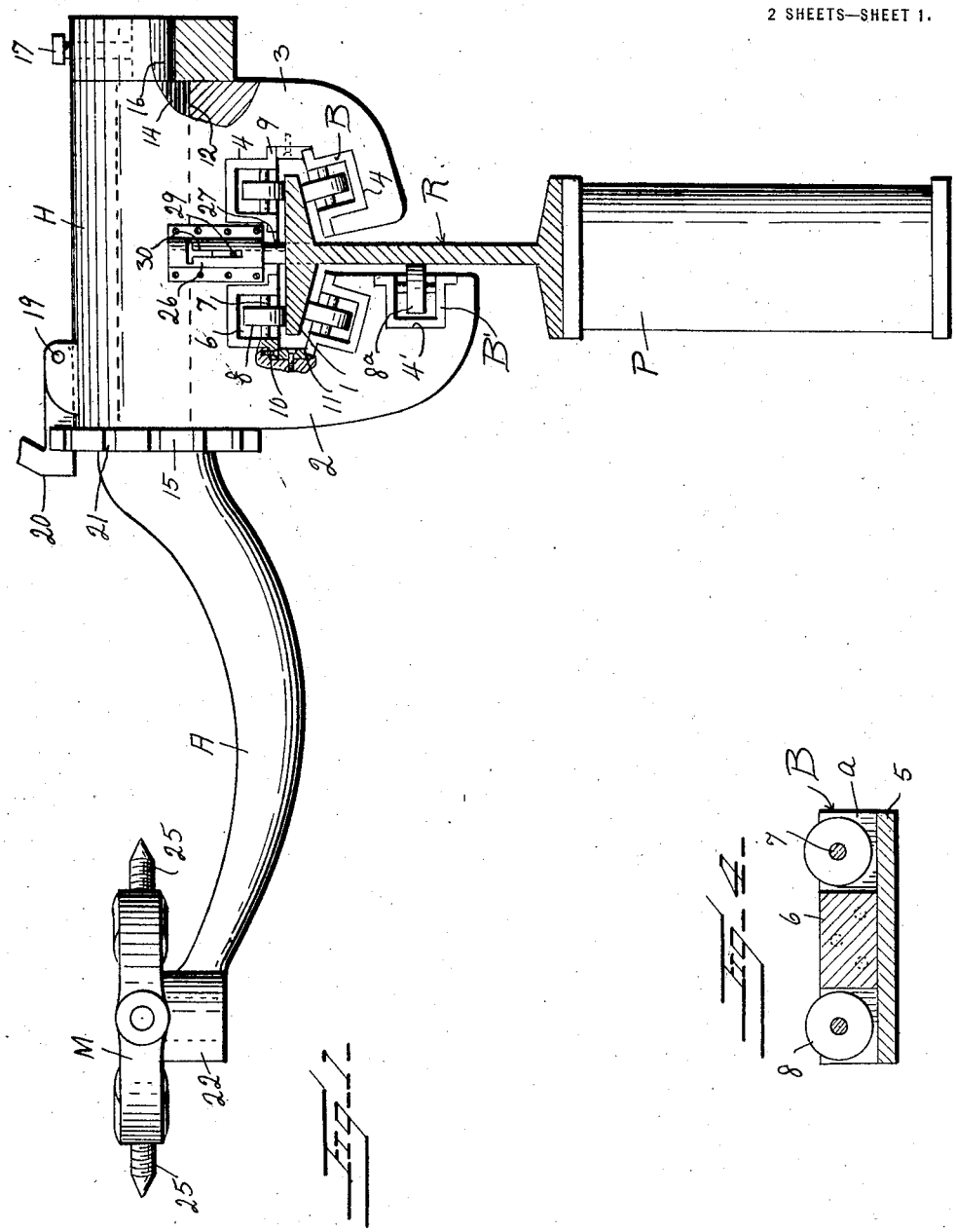

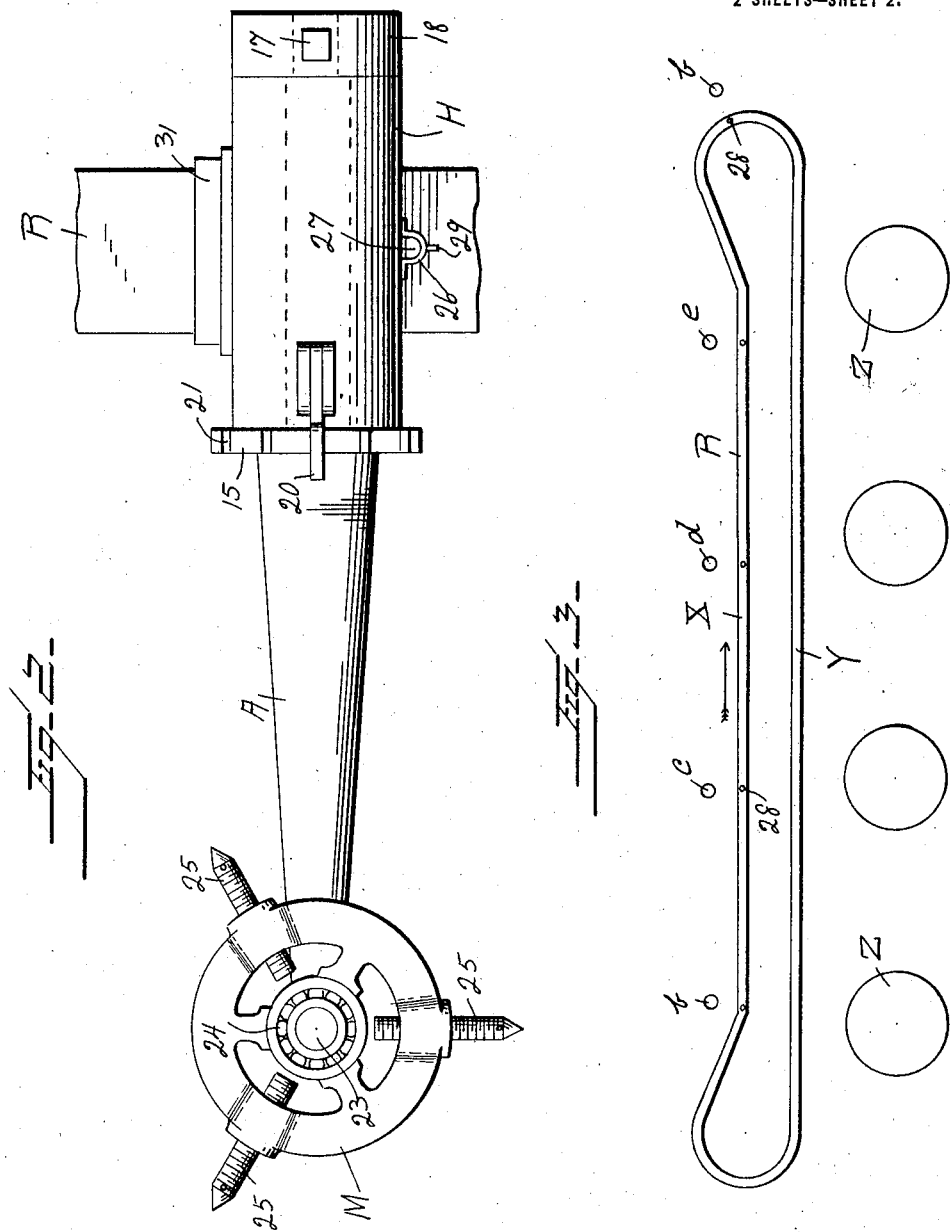

HARRY F. BARTLETT, OF MUSKEGON, MICHIGAN.

TIRE-BUILDING BUCK.

1,333,150.　　　　Specification of Letters Patent.　　Patented Mar. 9, 1920.

Application filed April 26, 1919. Serial No. 292,835.

*To all whom it may concern:*

Be it known that I, HARRY F. BARTLETT, a citizen of the United States, residing at Muskegon, in the county of Muskegon and State of Michigan, have invented certain new and useful Improvements in Tire-Building Bucks, of which the following is a specification, reference being had to the accompanying drawings.

This invention relates to certain improvements in tire building bucks, and has relation more particularly to a device of this general character especially designed and adapted for use in connection with tire building machines, and it is an object of the invention to provide a novel and improved device of this general character adapted to travel along a mono-rail in order that the various operations incident to the building of a tire may be obtained with a material saving of time, labor and expense.

Another object of the invention is to provide an arrangement of parts wherein the mono-rail is directed in a manner common to the various machines and operations incident to the building of a tire and upon which travels a plurality of bucks of a novel and improved type each provided with a core supporting means so that the core and tire being formed thereon may be positioned and adjusted in accordance with the occasions of practice.

An additional object of the invention is to provide a novel and improved buck which includes a head adapted to travel along a mono-rail and which head has engaged therewith a spindle adapted for rotary movement about the substantially horizontal axis and wherein said spindle has coacting therewith a core supporting means adapted for rotation about an axis substantially at right angles to the axis of rotation of the spindle.

Another object of the invention is to provide a novel and improved buck including a head adapted to travel along a mono-rail and which head is provided with means engageable with the rail to offset or compensate for the strain of the load imposed upon the buck spindle or arm coacting with the head.

Furthermore, it is an object of the invention to provide a novel and improved buck adapted to travel along a mono-rail and which carries means coacting with the rail for holding the buck against movement when in desired positions along the rail.

The invention consists in the details of construction and in the combination and arrangement of the several parts of my improved buck whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view, partly in side elevation and partly in section, illustrating a buck constructed in accordance with an embodiment of my invention and in applied position.

Fig. 2 is a view in top plan of a buck constructed in accordance with an embodiment of my invention, the coacting mono-rail with which the buck coacts being shown in fragment.

Fig. 3 is a diagrammatic view in top plan illustrating an arrangement of the mono-rail with which my improved buck coacts, and Fig. 4 is an enlarged fragmentary sectional view taken longitudinally through one of the boxes employed in connection with the head as herein disclosed.

As disclosed in the accompanying drawings, R denotes a mono-rail, preferably endless, and which is adapted to be supported at a predetermined distance above the floor or other foundation. The rail R is preferably mounted upon a plurality of pedestals, one of said pedestals P being disclosed in Fig. 1 of the accompanying drawings. The upper portion of the rail R is provided with the oppositely directed flanges 1 for a purpose to be hereinafter more particularly described.

My improved buck includes a head H which, when in applied position upon the rail R, is arranged at right angles to the said rail. The head H, at opposite sides of the rail, is provided with the depending arms 2 and 3, each of said arms 2 and 3 having its lower or free end portion inwardly directed to underlie the flanges 1.

The under face of the head H between the arms 2 and 3 and the faces of the lower or free end portions of said arms underlying the flanges 1 are provided with the transversely disposed channels 4 and in each of said channels is snugly engaged a boxing B.

The boxings B are interchangeable and each comprises an elongated body portion 5 substantially U-shaped in cross section and which has arranged centrally thereof a block 6 held therein in any desired manner and which block serves as a reinforcement for the box. The opposite ends of the box B are provided with the chambers a and each of which is intersected by a shaft 7 carrying a roller 8 for contact with a flange 1.

The side members of each of the boxes B are defined by the outstanding lips 9 overlying the portions of the head or arms adjacent the groove 4 in which said box is arranged, and suitable fastening members, as indicated at 10 in Fig. 1, are disposed through each of said lips 9 to maintain the box in applied position within its groove. Each of these fastening members 10 is readily removable so that the boxes B may be conveniently interchanged or replaced as required.

Each of the arms 2 and 3 has removably secured thereto a plate 11 which contacts and serves as a reinforcement for each pair of boxings B arranged at either side of the rail R. The upper rollers 8 engage the top surfaces of the flanges 1 and the lower rollers 8 engage the under surfaces of said flanges and serve to support the load, while the rollers 8 of the arms 2 and 3 serve to grip the rail and effectively maintain the head H in desired position thereupon. It will also be obvious that these rollers 8 serve as anti-friction means to facilitate the travel of the head H along the rail R.

The head H has disposed longitudinally therethrough a bore 12 in which is snugly engaged a spindle 14 arranged at one end of an arm A and extending longitudinally of said arm. The spindle 14, at its junction with the arm A, is provided with an outstanding annular flange 15 which substantially abuts an end of the head H when the spindle 14 is in applied position and the free end portion of the spindle 14 is provided with a reduced extension 16 to which is clamped, through the medium of the screw 17 or the like, a holding collar or knuckle 18. It will be self-evident that upon releasing the collar or knuckle 18, the arm A may be readily removed from the head H.

Pivotally engaged, as at 19, with the upper portion of the head H is a dog 20 coacting with the notches 21 produced in the periphery of the flange 15 for holding the spindle 14 and the arm A against rotation and for holding said arm in its different rotary adjustments.

The arm A is preferably substantially arcuate in form and is provided at its outer or free extremity with a bearing 22 in which is engaged a stub shaft 23 perpendicularly related to the axis of the spindle 14. Engaged with the shaft 23, above the bearing 22, is a core-supporting member M rotatable with the shaft 23 as its axis, and in order to minimize the frictional resistance in the rotation of the member M, I find it of advantage to employ the bearings 24 of any desired type.

The member M includes the radial adjustable members or screw-pins 25 adapted to engage the core of a tire being built.

The arm 2 is at the side of the rail R from which the arm A projects and said arm 2 terminates below the arm 3 and coacts with the web of the rail R so that said arm 2 serves effectually as a brace to take the strain of the load imposed on the arm A and particularly when the work is mounted upon the member M.

One side of the head H has secured thereto a casing 26 in which is arranged a vertically movable bolt 27 adapted to seat within the pockets or recesses 28 formed in the upper surface of the rail R to hold the head H in its various working positions along the rail R. It is preferred that the bolt 27 move by gravity toward the rail R. In order to elevate the bolt to release the head H, an outstanding pin 29 is provided and which is directed through the T-slot 30. The head of the slot is at the upper end thereof so that when the bolt 27 is elevated, a partial rotation thereof in either direction will position the pin 29 within the head of the slot 30 and thus hold the bolt 27 against dropping.

As will hereinafter be explained, it is intended that a plurality of heads H, with their concomitant parts, travel upon the rail R and for this reason the side portion of each head, opposite to the casing 26 be provided with a buffer or bumper 31 which operates to absorb the shock incident to said head H accidentally coming into contact with a second or adjacent head.

The lower portion the arm 2, in its face opposed to the web of the rail R, is also provided with a transversely disposed groove 4' in which snugly engages a boxing B' preferably of the type hereinbefore described relative to the boxing B and interchangeable therewith. The anti-friction means 8ª carried by said boxing B' directly engages the web of the rail for a purpose which is believed to be self-evident.

As is particularly illustrated in Fig. 3, the mono-rail is continuous and comprises two stretches X and Y in close proximity one to the other and preferably spaced apart a distance only sufficient to permit the unobstructed passage of the bucks. The stretch Y extends adjacent to machines diagrammatically indicated at Z which are of the well known type of wrapping machines, so that the cores and tires initially formed thereon may be placed on the members M of the bucks.

I wish to state at this time that in practice I find it of particular advantage to employ a plurality of bucks, although I have only illustrated and described one of my improved bucks, as it is thought that this is sufficient for the purposes of disclosure.

After the core and tire have been applied to a member M of a buck, this buck is caused to travel through the stretch X of the rail R and which stretch is preferably provided with four stations $b$, $c$, $d$ and $e$, and at each of which stations a pocket or recess 28 is provided so that a buck may be held stationary at such station while being operated upon by the workman. At the station $b$, the bead strips are applied to the tire; at the station $c$, the side walls are applied; at the station $d$, the cover or cushion and breaker strips are applied, and at the station $e$, the tread strips are applied or any other operation necessary to complete the tire.

By this arrangement, it will be perceived that any of the various operations can be effected by a workman skilled and specialized in this particular operation, so that a greater number of tires can be produced than in connection with the stationary type of buck now employed and wherein a single workman is required to make all four of these operations. It is also to be stated that with the provision of these several stations, a material saving in stock is effected and permits each workman an opportunity to inspect the work of a previous operation. With the use of my improved traveling buck, a material saving is effected in waste motion of the operator.

I also find it of advantage to provide a further station $f$ where an inspector is located to examine the tire when completed ready for the vulcanizers and who also can remove the core and its tire and continue the buck to the stretch Y to receive another core and tire from one of the machines Z.

It will also be obvious that with a system embodying a mono-rail and bucks constructed in accordance with my invention, a centralizing of the operations is effected, together with a material reduction in floor space and handling of stock, and also readily permits a convenient assortment of tires according to sizes and otherwise tends toward a maximum of efficiency.

From the foregoing description, it is thought to be obvious that a buck constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a mono-rail, a tire carrying buck adapted to travel thereon and including a head engaging the rail at opposite side portions.

2. In combination with a mono-rail, a tire carrying buck adapted to travel thereon and including a head engaging the rail at opposite side portions, said head being provided with means coacting with the rail for bracing the head against the strain of the load imposed thereupon.

3. In combination with a mono-rail, a tire carrying buck adapted to travel thereon and including a head engaging the rail at opposite side portions, and means carried by the head and coacting with the rail for locking the head against movement along the rail.

4. In combination with a mono-rail, a tire carrying buck adapted to travel thereon and including a head engaging the rail at opposite side portions, and a bumper carried by the head.

5. In combination with a mono-rail, a buck including a head mounted upon the rail to travel therealong, an arm supported by the head for rotation about an axis angular to the rail, and coacting means carried by the head and the arm for locking the arm against rotation.

6. In combination with a mono-rail, a buck including a head mounted upon the rail to travel therealong, an arm supported by the head for rotation about an axis angular to the rail, coacting means carried by the head and the arm for locking the arm against rotation, and a tire carrying member mounted upon the arm and rotating around an axis substantially perpendicular to the axis of rotation of the arm.

7. In combination with a mono-rail including oppositely directed flanges extending therealong, a buck including a head resting on said rail and adapted to travel therealong, and arms depending from the head and coacting with the under surfaces of the flanges.

8. In combination with a mono-rail including oppositely directed flanges extending therealong, a buck including a head resting on said rail and adapted to travel therealong, and arms depending from the head and coacting with the under surfaces of the flanges, one of said arms engaging the web of the rail.

9. In combination with a mono-rail provided with oppositely directed flanges, a buck including a head extending across the rail, anti-friction means carried by the head and engaging the rail, arms depending from the buck at opposite sides of the rail and extending inwardly of the flanges, and anti-friction means carried by said arms and engaging the inner surfaces of the flanges.

10. In combination with a mono-rail provided with oppositely directed flanges, a buck including a head extending across the rail, anti-friction means carried by the head and engaging the rail, arms depending from the buck at opposite sides of the rail and extending inwardly of the flanges, anti-friction means carried by said arms and engaging the inner surfaces of the flanges, and anti-friction means carried by one of said arms and engageable with the web of the rail.

11. In combination with a trackway, a tire carrying buck adapted to travel thereon and including a head engaging the opposite side portions of said trackway, said head being provided with means coacting with the trackway for bracing the head against the strain of the load imposed thereon.

12. In combination with a trackway including oppositely directed flanges, a buck including a head resting on said trackway and adapted to travel therealong, and arms depending from the head and coacting with the under surfaces of the flanges.

In testimony whereof I hereunto affix my signature in the presence of two witnesses.

HARRY F. BARTLETT.

Witnesses:
EDNA E. STARKS.
WENONAH T. BUTTERWORTH.